US011966200B2

(12) United States Patent
O'Brien et al.

(10) Patent No.: US 11,966,200 B2
(45) Date of Patent: Apr. 23, 2024

(54) MECHANICAL WATCH HAVING AN INTEGRATED TRACKING MODULE

(71) Applicants: Patrick Damien O'Brien, Cheshire (GB); Jez Noah Ali, Cheshire (GB); Arthur Ali, Cheshire (GB)

(72) Inventors: Patrick Damien O'Brien, Cheshire (GB); Jez Noah Ali, Cheshire (GB); Arthur Ali, Cheshire (GB)

( * ) Notice: Subject to any disclaimer, the term of this patent is extended or adjusted under 35 U.S.C. 154(b) by 0 days.

(21) Appl. No.: 18/112,755

(22) Filed: Feb. 22, 2023

(65) Prior Publication Data

US 2024/0085854 A1 Mar. 14, 2024

Related U.S. Application Data

(60) Provisional application No. 63/375,218, filed on Sep. 9, 2022.

(51) Int. Cl.
*G04G 21/04* (2013.01)
*G01S 1/68* (2006.01)
*G04B 47/00* (2006.01)

(52) U.S. Cl.
CPC .............. *G04B 47/00* (2013.01); *G01S 1/68* (2013.01); *G04G 21/04* (2013.01)

(58) Field of Classification Search
CPC ........ G04B 47/00; G04B 19/04; G04G 21/04; G01S 1/68; G06K 7/10257
See application file for complete search history.

(56) References Cited

U.S. PATENT DOCUMENTS

| | | | |
|---|---|---|---|
| 5,105,397 A * | 4/1992 | Whitney | G09B 19/12 368/76 |
| 9,443,366 B2 | 9/2016 | Rayner | |
| 11,165,141 B2 * | 11/2021 | Hsu | G04B 21/04 |
| 2003/0198140 A1 * | 10/2003 | Shimizu | G04R 20/10 368/47 |
| 2005/0157592 A1 * | 7/2005 | Nakamura | G04G 21/04 368/47 |
| 2012/0242481 A1 | 9/2012 | Gernandt et al. | |

OTHER PUBLICATIONS

Jeremy Cook, The Smallest Radio Transmitter You've Ever Seen, https://www.hackster.io, 2018.
U-blox Launches The World's Smallest GPS Module, https://www.electronicsforu.com/news/, 2022.

* cited by examiner

*Primary Examiner* — Sean Kayes
(74) *Attorney, Agent, or Firm* — Allen F. Bennett; Bennett Intellectual Property (57) ABSTRACT

A mechanical watch includes an internal tracking module. The tracking module includes a transmitter, a microprocessor, and optionally a GPS module and a power source. The components of the tracking module are integrated into the watch by embedding them within one or more components of the mechanical watch. If a watch is lost or stolen, the tracking module may be actuated to provide location data over a network to a software application. To conserve power, the tracking module only actively receives and/or transmits signals periodically during intermittent windows of time.

4 Claims, 6 Drawing Sheets

MECHANICAL WATCH HAVING AN INTEGRATED TRACKING MODULE

CROSS-REFERENCE TO RELATED APPLICATIONS

This application claims priority to U.S. Provisional Application Ser. No. 63/375,218 filed on Sep. 9, 2022, the contents of which are hereby incorporated in their entirety.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable.

BACKGROUND OF THE INVENTION

Field of the Invention

The present invention relates to methods and systems for discretely tracking personal effects. More particularly, the invention relates to a method for tracking watches and other objects that are misplaced or stolen.

Description of the Related Art

Keeping track of one's personal belongings, especially the smaller more expensive ones has been a problem almost as old as mankind itself. In the last several years a particularly attractive method for overcoming this problem is to utilize some sort of electronic tag which is connected via a wireless network or system. Such tags have become ubiquitous on keychains and luggage. However, they are not practical for smaller items such as jewelry and watches.

Smart watches have GPS and means for tracking them. However, many expensive watches are mechanical, having hands that rotate over a dial which are actuated by gears that may be powered by a mechanical battery such as a main spring, which are wound or are self-winding. If a wireless device is added to such a watch, it is easily identified and removed, thus defeating its purpose.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

In view of the foregoing, it is desirable to provide a discrete and practical means for tracking non-electronic watches or jewelry.

BRIEF SUMMARY OF THE INVENTION

Disclosed are systems and methods used to eradicate the modern-day epidemic of watch theft by adding a discrete tracking device. As they are built into an object and triggered when stolen, they turn a watch or other valuable item from a lucrative prize to a deadly target. This makes it easy for the police to track, identify and recover a watch or other valuable objects, saving insurance companies millions and claims. The systems and methods disclosed herein both protect and enhance the look and functionality of a watch or other object with discreet and stylish additions that provide reassurance. The device is incorporated into watches are so lightweight that they do not disrupt the functionality of exquisite timepieces. They can be incorporated into various mechanical components inside a watch such as, for example, embedded within the gears, the balance wheel, the bezel, the crown, the watch link, or concealed within a watch strap. Software such as a cell phone application may be used to ascertain the exact location of the watch and be used to provide that information to law enforcement or other organizations.

In one embodiment, the mechanical time display watch with an anti-theft tracking device is a mechanical watch having an internal tracking module. The tracking module is comprised of a microprocessor, transmitter, and a battery as a power source. The transmitter is embedded within the hands of the watch, the microprocessor is embedded within an inner gear, and the battery is hidden within a hollowed out link.

In another embodiment, the transmitter is embedded within the bezel of the watch, the microprocessor is embedded within the head of the crown, and the battery is hidden within replacement watch backing.

It is therefore an object of the present invention to provide systems and methods for wirelessly tracking small valuable objects using a tracking module that requires little power and is extremely difficult to detect by a thief.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices may be shown in block diagram form in order to facilitate describing the various embodiments herein.

Various embodiments of the disclosure could also include permutations of the various elements as if each dependent claim was a multiple dependent claim incorporating the limitations of each of the preceding dependent claims as well as the independent claims. Unless explicitly stated otherwise, such permutations are expressly within the scope of this disclosure. Similarly, the disclosure should be interpreted as including permutations of the various elements disclosed in the Figures, unless the various elements are clearly mutually exclusive.

Unless otherwise indicated, all numbers expressing quantities of ingredients, dimensions reaction conditions and so forth used in the specification and claims are to be understood as being modified in all instances by the term "about". The term "a" or "an" as used herein means "at least one" unless specified otherwise. In this specification and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise. The term "mechanical watch" refers to a watch that has hands which rotate over the face of the watch and utilize mechanical mechanisms, including a gear train, escapement and main spring to actuate the hands, as opposed to watches that are primarily electric and lack internal gear "clockwork" mechanisms. Some mechanical watches, for example quartz watches, include a battery and electric motor in place of a main spring, but are otherwise mechanical. Dynamic mechanical components are the various components which move, such as the hands, gears, main spring, balance wheel, sprockets, escapement, and the like. Static components are those which do not move, such as the bridge and other structural features.

Throughout this specification, the principles of the invention have been described in relation to use with in a wristwatch, and in particular a mechanical wristwatch. However, those skilled in the art will appreciate that the invention may also be incorporated into other types of watches as well as into a wide variety of devices such as jewelry and thumb drives and may also be utilized for larger objects such as keychains and luggage.

Various embodiments of the disclosure could also include permutations of the various elements recited in the claims as if each dependent claim was a multiple dependent claim incorporating the limitations of each of the preceding dependent claims as well as the independent claims. That is, the combinations of the various components of the invention are not limited to those combinations expressly shown in the Figures. Unless expressly stated otherwise, components described in one embodiment may be interchanged with components of the same name found in other embodiments. Such permutations are expressly within the scope of this disclosure.

Disclosed is a mechanical watch having an integrated tracking module. The tracking module is composed of one or more components that are be easily and inconspicuously incorporated into the mechanical components of a mechanical watch to discreetly track the location of the watch. Because the tracking module is integrated into the mechanical components, it is not readily identified and removed. The inconspicuous nature of the tracking module makes it more difficult to identify and also prevents it from reducing the aesthetic appeal of the mechanical watch into which it is incorporated.

The tracking module is composed of a transmitter, a microprocessor, and optionally a power source and/or GPS module. The transmitter may optionally use components of the mechanical watch, for example the hands, the watch band, and/or the bezel as an antenna. In accordance with principles of the invention the electrical power source may be a battery concealed within the case back, or within a link or clasp of the watch band. The battery may be configured to be recharged by the winding of the watch or by another spring. Those skilled in the art will appreciate that some watches are self-winding and include internal components that automatically wind the watch using the random motions experienced by the watch while being worn. The tracking module may also be powered by such a winding device.

The tracking module may also include a GPS device. A GPS device typically requires an electrical power source. In accordance with principles of the invention the electrical power source may be a battery configured to be recharged by the winding of the watch, solar panels incorporated into the face or band of the watch, or by a wireless induction charging plate. Those skilled in the art will appreciate that some watches are self-winding and include internal components that automatically wind the watch using the random motions experienced by the watch while being worn. The tracking module may also be powered by such a winding device.

Alternatively, the tracking module may be an RFID tag. RFID tags do not require power but are only detected by particular types of mechanisms. However, RFID tag detectors have become so commonplace it is difficult to move about a modern city without encountering them. Thus, the RFID tag may be configured to return a signal to any RFID tag detector. As a result, anyone wearing the watch will set off alarms at department stores, Metro rail terminals and other locations. The RFID detectors may be incorporated into a network to provide information regarding the times and locations when the RFID tag was detected. When an RFID tag is utilized as the tracking module, the only power required of it is the power needed to operate a transmitter for receiving a triggering signal. Those skilled in the art will appreciate that there are other alternative short range signals that may similarly be used with the tracking module, such as for example Bluetooth® networking technology.

Figure 1:
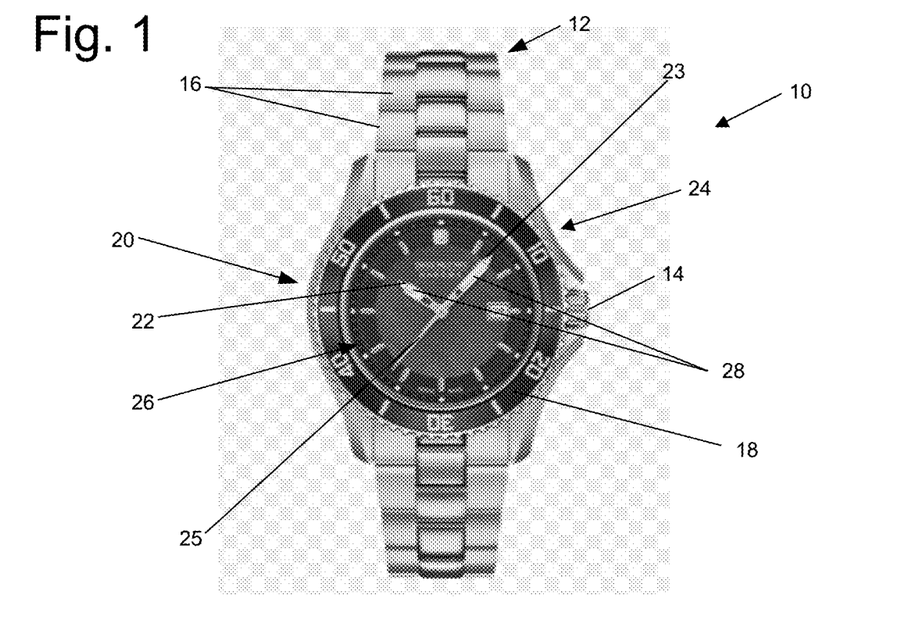
FIG. 1 is a top plan view of a mechanical watch having an integrated tracking module in accordance with the principles of the invention.
Figure 2:
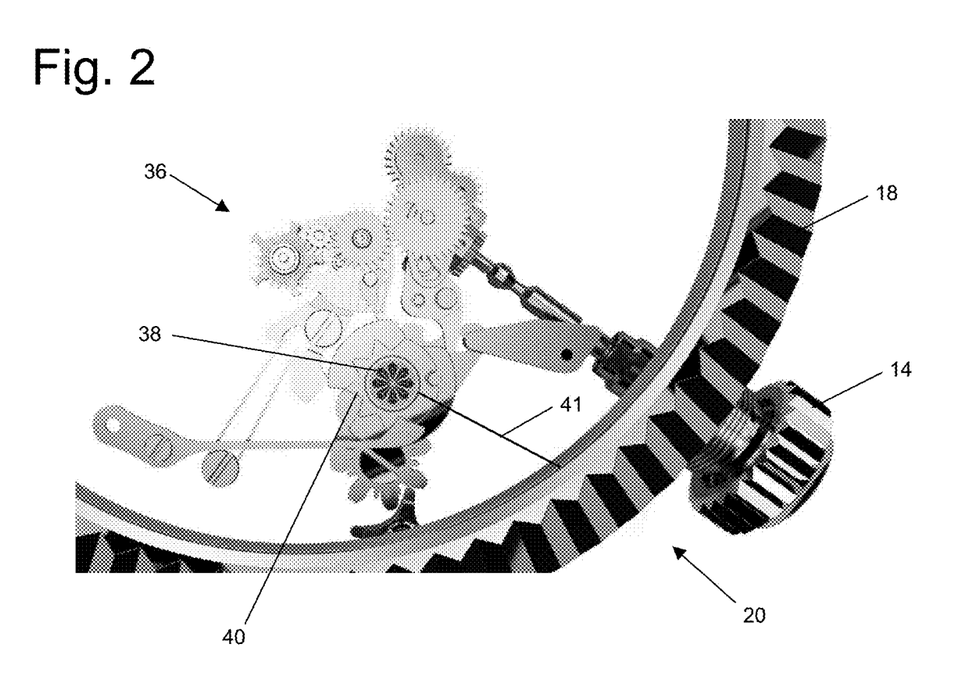
FIG. 2 is a cut-away view the internal mechanical components a mechanical watch having an integrated tracking module in accordance with the principles of the invention.
Figure 3:
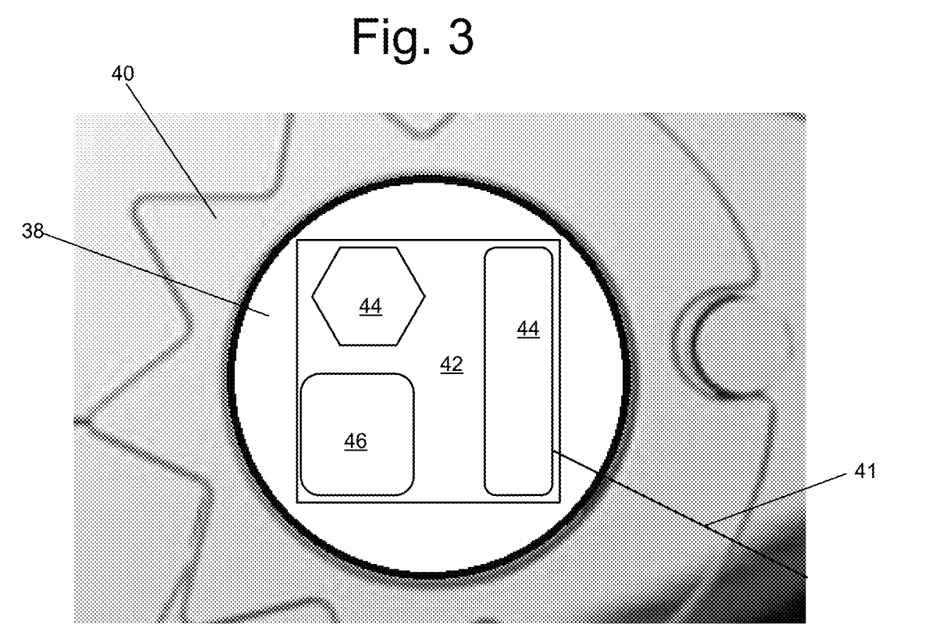
FIG. 3 is a cross-sectional view of a tracking module embedded within a gear of a mechanical watch having an integrated tracking module in accordance with the principles of the invention.

FIGS. 1-3 show a mechanical watch with an integrated tracking module 10, in accordance with the principles of the invention. In this embodiment, the watch 10 is comprised of a case 20 which houses a face, or dial, 26. An hour hand 22, a minute hand 23, and an optional second hand 25 are actuated by internal mechanisms 36. The dial 26 has indices arranged about the dial 26 to designate the time according to the positions of the hands. In this embodiment, the hands 22, 23, and/or 25 act as antennae for the transmitter 44, which sends and receives signals via a wireless network. Hands 22 and 23 also are illuminated by lights 28.

The positions of the hands 22 and 23 are adjusted by manipulating a crown 14, which extends from one side of the case 20. A protective transparent lens 24 extends over the dial 26 and hands. The lens 24 is surrounded by an annular bezel 18. The watch 10 is attached to a band 12 for securing the watch 10 to a user's wrist. In this embodiment, the band 12 is composed of plurality of links 16 and a buckle or clasp, such as for example a deployant clasp.

FIG. 2 shows a portion 36 of the gear train, crown and other mechanisms inside the watch case 20. The tracking module 38 is circular and incorporated into the body of a gear 40. In this embodiment, the microprocessor is a small, compact disk shaped device. However, any shape microprocessor may be utilized, so long as it is able to be embedded within one of the inner components. The tracking module 38 may be embedded into any mechanical mechanism, dynamic or static, within the watch. It is generally preferable for the tracking module to be integrated into a dynamic component because such placement makes it more difficult to identify and/or remove.

Referring to FIG. 3, the tracking module 38 includes a microprocessor 42, which in this embodiment is formed on a printed circuit board PCB. The tracking module 38 also includes a transmitter 44 which is in electrical communication with one or more of the hands 22, 23 and 25 which act as antennae. Optionally, the bezel 18 may be connected to the transmitter 42, via connection 41, so that it may act as an antenna instead of, or in addition to, the hands. The tracking module 38 of this embodiment also includes a GPS module 44, and a memory storage module 46. The memory storage module 46 of the tracking module stores various predetermined information which may be modified by a user. In this embodiment, all of the components of the tracking module are included in a single, unitary module. However, the separate components may be physically separated. For example, the GPS module and the memory storage module may optionally be separate components located in different positions within the mechanical watch. In some cases it may be desirable to include the GPS module embedded in a separate gear and in electrical communication with the other components of the tracking module.

Figure 4:
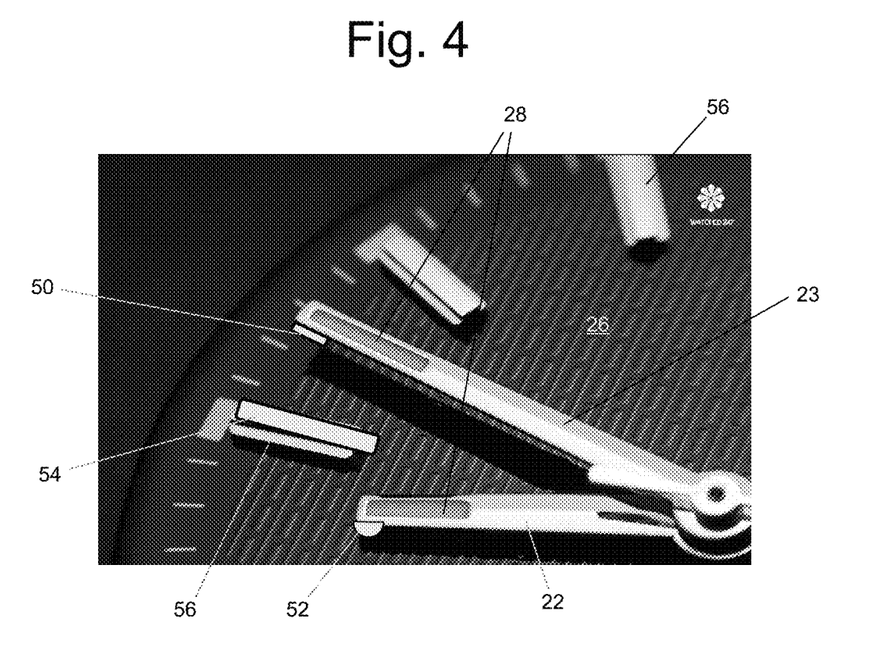
FIG. 4 is an enlarged view of the dial of a mechanical watch having an integrated tracking module in accordance with principles of the invention.

FIG. 4 shows the hour hand 22 and minute hand 23 rotating over the dial 26. Minute hand 23 has a small trigger 50 extending downwardly from it. Similarly, the hour hand 22 has a trigger 52 extending downward. Triggers 50 and 52 are positioned underneath the respective hands 23 and 22, such that they are inconspicuous. A trigger actuator 54 is located on the dial 26 and is a component of one of the indices 56. In this embodiment, the trigger actuator 54 is incorporated into the index for the top of the hour, i.e. "12." Because the trigger actuator 54 is incorporated into one of the indices 56, it is also substantially inconspicuous. Only a single trigger actuator 54 is provided in this embodiment, however, the dial 26 may optionally include a plurality of trigger actuators 54. The trigger actuator 54 may optionally be located anywhere on the dial 26. The use of triggers and a trigger actuator are optional components that maybe included conspicuously and which may assist in reducing the size and power requirements of the tracking module.

Each of the triggers 50 and 52 generate a trigger signal sent to the tracking module 38 when they pass over the trigger actuator 54. Optionally, only one of the hands 22 and 23 may include a trigger. The triggers 50 and 52, and the trigger actuator(s) 54 are optional and may be used in the setting and configuring of various predetermined time intervals and windows of time described in more detail below.

A skilled artisan will appreciate that the triggers 50 and 52 and trigger actuator 54 may be any of a wide variety of mechanisms known to interact sufficiently to generate a signal. For example, the triggers 50 and 52 may simply be a tab is biased against rotating about a hinge. The trigger actuator 54 would then simply be a stationary tab that causes triggers 50 and 52 to rotate about their hinges. Trigger actuator 54 may optionally be a small magnet and the triggers 50 and 52 mechanisms for detecting a change in magnetic field. Another example would be where the trigger actuator 54 closes an electric circuit when it comes in contact with one or both of triggers 50 and 52. The trigger actuator 54 may also optionally be located on one of the other watch hands, or on the inside of the lens cover.

Figure 5:
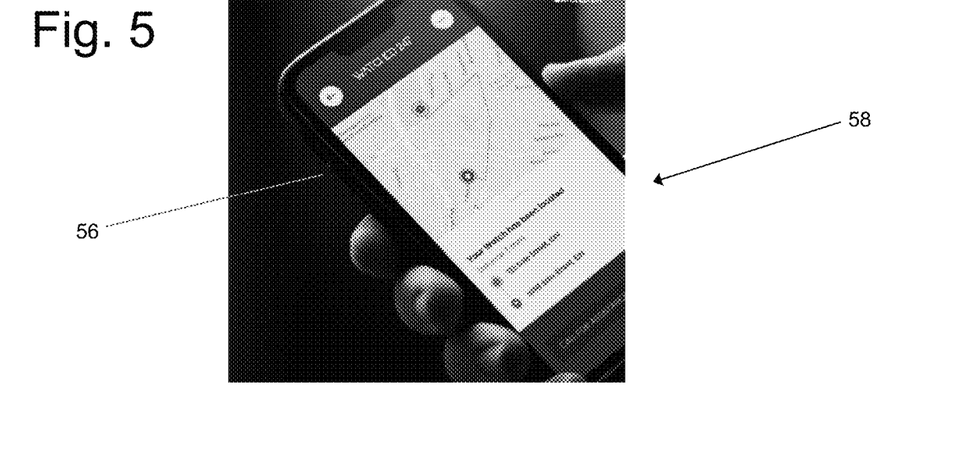
FIG. 5 is a perspective view of a mobile device executing a software application for a mechanical watch having an integrated tracking module in accordance with principles of the invention.

FIG. 5 shows a mobile device 58 displaying a software application 60 in accordance with the principles of the invention. The software application 60 of this embodiment is installed on the mobile device 58, but can be run on most any electronic device capable of sending and receiving signals over a wireless network or connection. In this embodiment, the software application 60 is used to display a map identifying the location of an activated tracking module 38 incorporated into a mechanical time display watch 10. The software application 60 may also optionally forward the tracking module location data directly to law enforcement or other persons or entities. Optionally, the software application 60 may also be used to adjust predetermined parameters of operation for the tracking module 38, which may be stored in the storage module 46 or may optionally be Incorporated into the tracking module 38 as firmware. If the mechanical watch having an integrated tracking module 10 is lost or stolen, the software application 60 may be used to send an alert signal to the tracking module 10. The alert signal is transmitted continuously until the tracking module 38 begins sending location signals.

In use, the tracking module 38 is programmed to remain in a powered off state most of the time to minimize its power consumption. In this embodiment, the tracking module 38 is configured to activate the transmitter 44 at predetermined periodic intervals, for every twelve hours, and to remain in a passive listening mode for a predetermined window of time, for example 5 minutes. At the end of the predetermined window of time, e.g. five minutes, if no alert signal has been detected, the tracking module 38 powers down again to continue conserving power. The power available to the tracking module 38 is in general more limited than the power available to the software application 60. By only activating the tracking module 38 periodically for limited amounts of time, it's powers conserved and it may remain in operation for considerably longer than if the tracking module 38 was always in an active mode.

In this embodiment, the tracking module 38 has been configured to activate its transmitter 44 and passively listen for an alert signal for five minutes every time it receives a trigger signal from the trigger 52 on the hour hand 22. Thus, the tracking module 38 only listens for an alert signal every 12 hours for five minutes. The tracking module 38 may be reconfigured to power up and listen for five minutes when it receives a trigger signal from trigger 50 on the minute hand 23. Thus the tracking module 38 would listen for an alert signal once every hour. The tracking module 38 could also optionally be reconfigured to power up and listen for an alert signal every two hours.

Reconfiguring the time intervals between listening windows may be performed using the software application to send a programming update signal to the tracking module 38. The tracking module 38 will then update its programming, stored in module 46, the next time it powers up its transmitter to listen for a signal. Similarly, the duration of the listening window may also be adjusted. The tracking module 38 in this embodiment has been programmed to listen during a five minute window. However, this window may be as long or short as desired, and the software application may again be used to modify the duration of the listening window by sending a programming update signal. The tracking module 38 may optionally include an internal chronometer for measuring the intervals between listening windows and the duration of the listening windows themselves instead of using triggers 50 and 52, trigger actuator 54 and trigger signals.

When the tracking module 38 receives an alert signal from the software application, the microprocessor actuates the transmitter to begin sending a location signal. If no GPS module is included in the tracking module, the location signal may be a very brief, simple signal. The software application can then use triangulation or other techniques for determining the location of the tracking module based on how the signal travels through the wireless network. If the tracking module includes a GPS module, GPS location data from the GPS module may be included in the location signal. The tracking module continues to send location signals, which may include updated GPS data, until it receives a stop command. The stop command may be sent using the software application.

As another method to conserve power usage by the tracking module, the tracking module may be programmed to only send a location signal at predetermined intervals. For example, the tracking module 38 may be programmed to only send a location signal once every time it receives a trigger signal from the trigger 50 of the minute hand 23.

When the software application 60 receives a location signal from the tracking module 38, it may plot the location on a map and record the time at which the location signal is received. As subsequent location signals are received, the location and time may be used to update the map and track the movement of the mechanical watch. The software application may also be used to send a new programming signal to increase or decrease the frequency with which the tracking module sends a location signal. If the missing watch is nearby, it may be desirable to increase the frequency with which the location signal is sent. Conversely, if an operator anticipates that the watch cannot be retrieved for an extended time, it may be desirable to increase the intervals between the sending of location signals, to extend the amount of time the watch can be tracked. Once the watch is retrieved, the software application can sent a stop signal to discontinue the sending of location signals. The lights 28 on the hands 22 and 23 may optionally be used as inconspicuous indicators of the status of the tracking module. For example, the lights may flash a green light during the periodic listening windows, to indicate that the tracking module is operating properly. If an alert signal is received, the lights 28 may change to a red color, indicating that the tracking module has been activated to send periodic location signals. When the lights change color may optionally be modified and/or configured by a programming signal sent by the software application.

Figure 6:
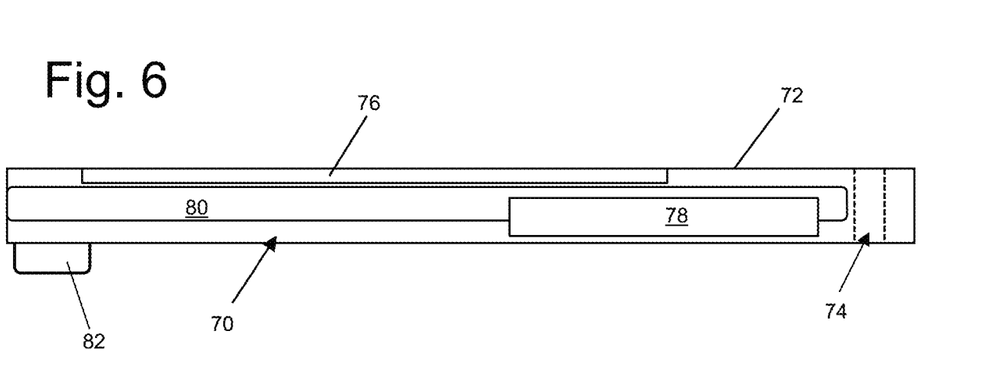
FIG. 6 is a side cross-sectional view of an alternative embodiment of a tracking module in accordance with the principles of the invention.

FIG. 6 shows an alternative embodiment of a tracking module 70 for use with a mechanical watch in accordance with principles of the invention. In this embodiment, the tracking module 70 is housed within a minute hand 72 which may either be added to the watch when it is originally made or used to replace an existing minute hand on an existing mechanical watch. Optionally, tracking module 70 may be incorporated into an hour hand. The minute hand 72 includes a bore 74 that slides over the appropriate post extending out of the center of the dial, and an illuminating light 76 running along the top of the hands 72. The tracking module 70 includes a microprocessor 78 and a transmitter 80. A trigger 82 extends downward from the hands 72 and functions similarly to triggers 50 and 52 of the previous embodiment, triggering the microprocessor 78 to activate the transmitter 80. Tracking module 70 may also utilize the minute hands 72 itself as an antenna.

Figure 7:
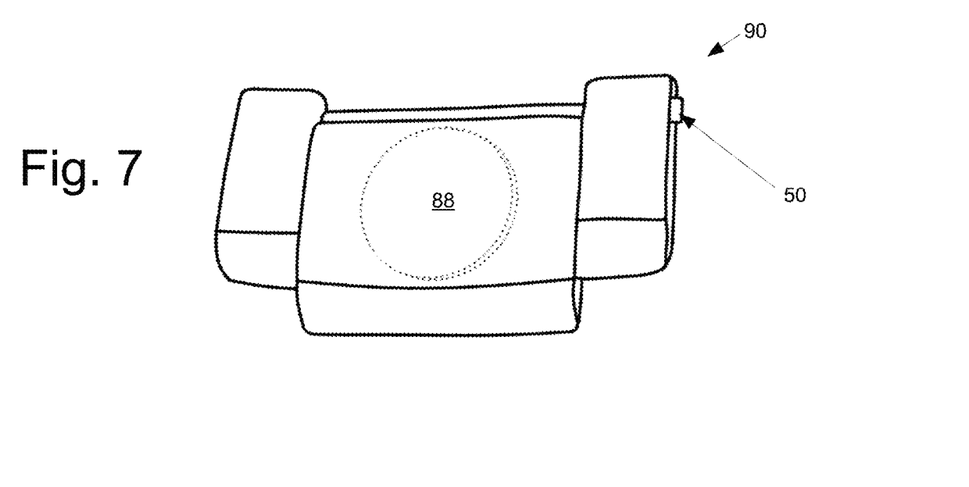
FIG. 7 is a perspective view of a link housing a battery for an alternative embodiment of a mechanical watch having an integrated tracking module in accordance with principles of the invention.

Tracking modules in accordance with principles of the invention will require a power source. As explained above, one generally preferred method of performing the invention is to utilize a tracking module configured and programmed to minimize the amount of power required to operate. In mechanical watches that utilize an electric battery is a power source, the tracking module may be powered by the preexisting battery source. However, purely mechanical watches powered only by a mainspring include no batteries from which the tracking module may draw electric power. For these types of purely mechanical watches, a dedicated power source, such as a dedicated battery, may be added to provide power to the tracking module of the invention. If possible, a battery may be Incorporated into the tracking module itself. However, current electrical batteries today, while small, are typically not small enough to fit within tracking modules of the present invention. For example, it would be difficult or impossible to incorporate an adequate battery into the tracking module 70 shown in FIG. 6. Furthermore, because batteries are relatively large components, they would be easily recognized by a sophisticated watch thief. FIG. 7 shows a power source 88 for a tracking module in accordance with principles of the invention. In this embodiment, the power source 88 is a battery hidden inside a watch link 52 configured to have an appearance similar to links 16 shown in FIG. 1 and is suitable for supplying power to any of the embodiments of tracking modules described herein. In order to best preserve the aesthetic appeal of a watch, for example watch 10, and to deter any suspicion, the link 88 the same material as the links 16 and should have approximately the same dimensions. However, the link 90 containing the battery 88 may optionally vary in size compared to the other links of a band. Optionally, one of the links 16 of the watch may be manufactured to contain a battery slot so that an additional link 16 does not have to be added or replaced. The hollow link 90 should generally be placed in the link closest to the case 20 of the watch to facilitate connection of the battery 88 to the microprocessor 38. However, the link 46 may be placed in any location along the watch band so long as the battery 88 could still be connected to the microprocessor.

Optionally, instead of a chemical battery, a mechanical battery may be used to power the microprocessor. Mechanical watches use a spring to store tension and slowly release the tension to produce mechanical work. Those skilled in the art will appreciate that some mechanical watches are self-winding and include internal components that automatically wind the mainspring of the watch using the random motions experienced by the watch while being worn. The microprocessor may also be powered by such a winding device. In this case, an additional spring may be included within the case of the watch. The added spring may be interconnected with the mainspring of the watch and be set to wind with the same self-winding mechanism. Alternatively, the added tracking module spring may be interconnected with the inner gears of the watch and set to automatically wind as the inner gears turn.

Figure 8:
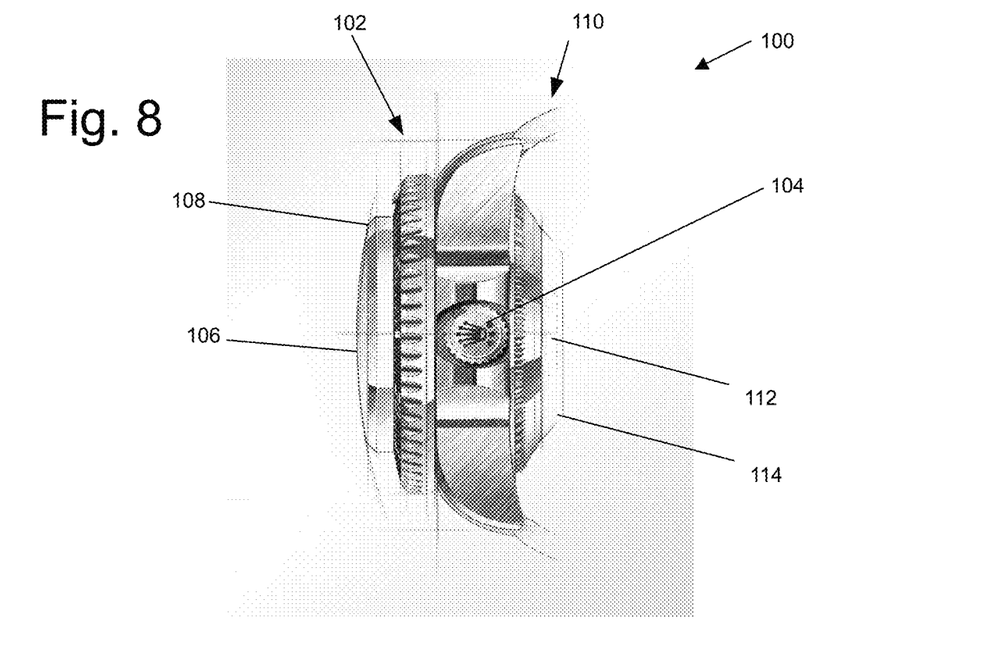
FIG. 8 is a side elevation view of another alternative embodiment of a mechanical watch having an integrated tracking module in accordance with principles of the invention.
Figure 9:
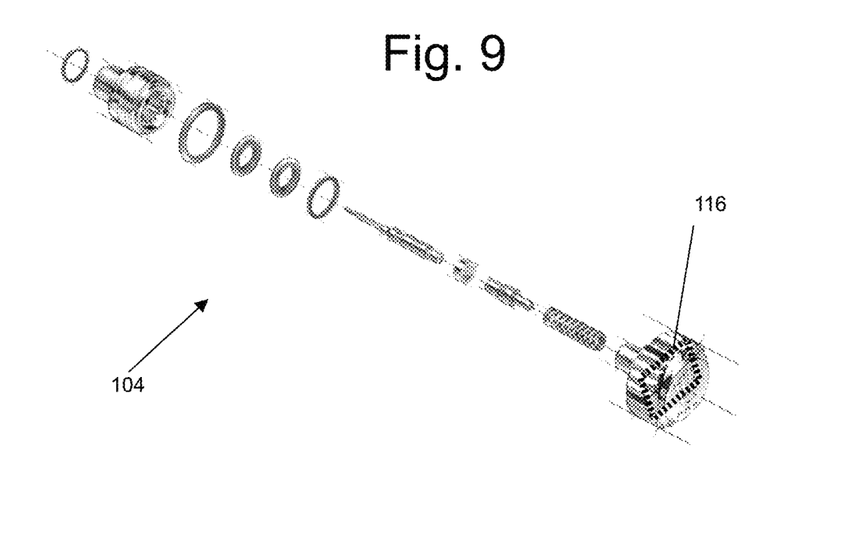
FIG. 9 is an exploded view of a crown of another alternative embodiment of a mechanical watch having an integrated tracking module in accordance with principles of the invention.
Figure 10:
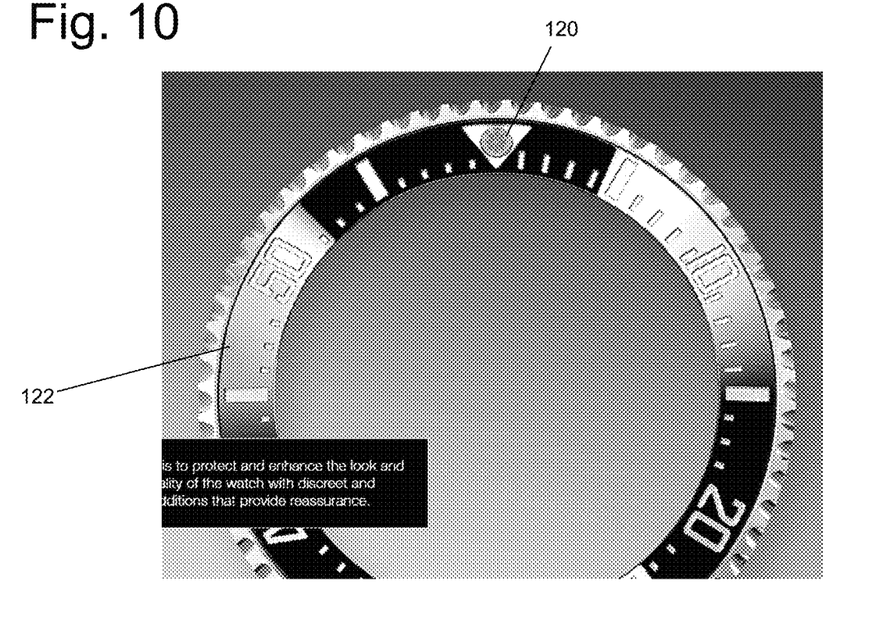
FIG. 10 is a top plan view of a bezel and transmitter for another alternative embodiment of a mechanical watch having an integrated tracking module in accordance with principles of the invention.
Figure 11:
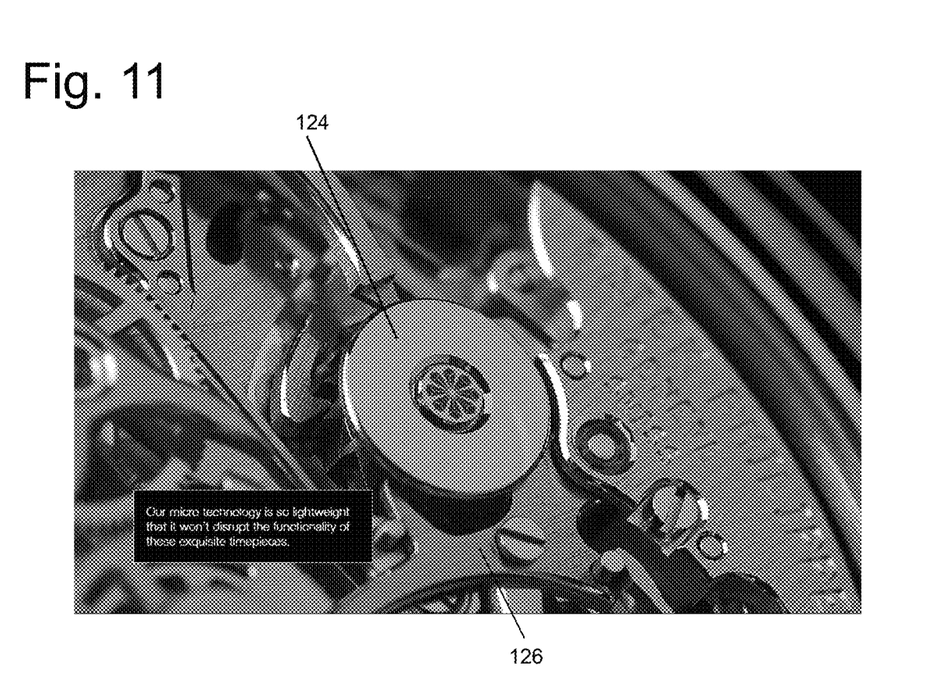
FIG. 11 is a perspective view of another alternative embodiment of a mechanical watch having an integrated tracking module in accordance with principles of the invention.

FIGS. 8-11 display an alternative embodiment of a mechanical watch with an anti-theft tracking module 100, in accordance with the principles of the invention. In this embodiment, the watch 100 is comprised of a case 102 housing the inner mechanisms of the watch 100. A crown 104 extends outward the side of the case 102 and connects to and winds the inner mechanical components. The contents of the case 102 are protected by a transparent lens 106 which is surrounded by an annular bezel 108. Further, the watch 100 contains a band 110 used to secure the watch 100 to a user's wrist. Finally, the watch 100 incorporates tracking module that can be used to locate and track the watch 100. In this embodiment, the various components of the tracking module are positioned in different locations. As shown in FIG. 8, the power source is a battery 112 hidden inside a replacement backing 114 for the watch 100. In order to install the tracking module, the original watch backing is removed and the replacement backing 114 containing the concealed battery 112 is attached to the watch 100 in the same position. The replacement backing 114 may be the same dimensions and be made of the same material as the original backing, or it may vary in size and material. As shown in FIG. 9, the crown houses a microprocessor 116. The microprocessor chip 116 is embedded into the head of the crown 104. FIG. 10 shows the transmitter 120 is incorporated into the bezel 122 of the watch 100. Transmitter 120 may optionally utilize the bezel 122 as an antenna As shown in FIG. 11, this embodiment, includes a tracking module 124 within the case 102 attached to the frame 126, a static mechanical component.

Figure 12:
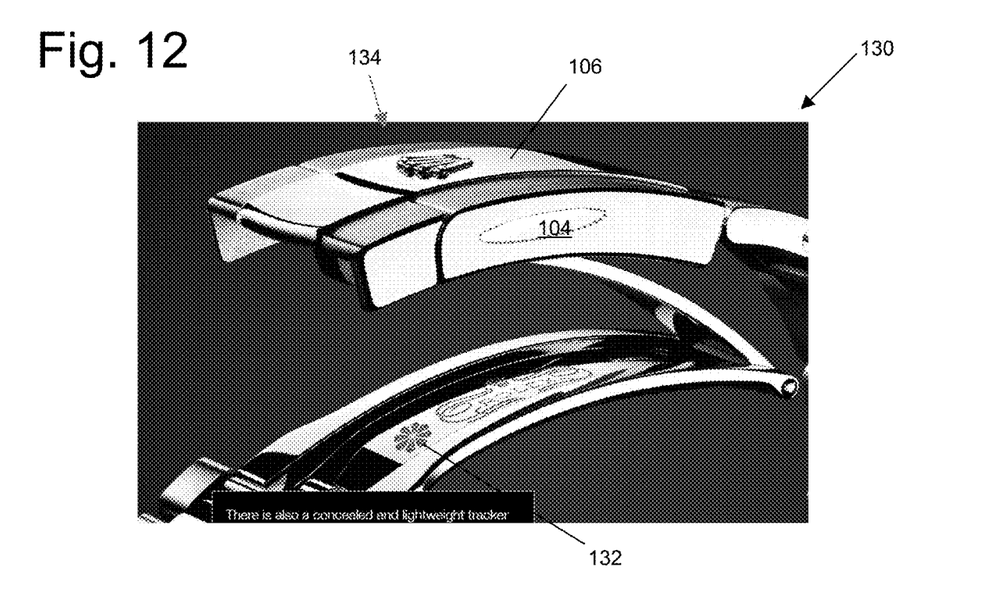
FIG. 12 is an enlarged perspective view of a class of a watchband of another alternative embodiment of a mechanical watch having an integrated tracking module in accordance with principles of the invention.
Figure 13:
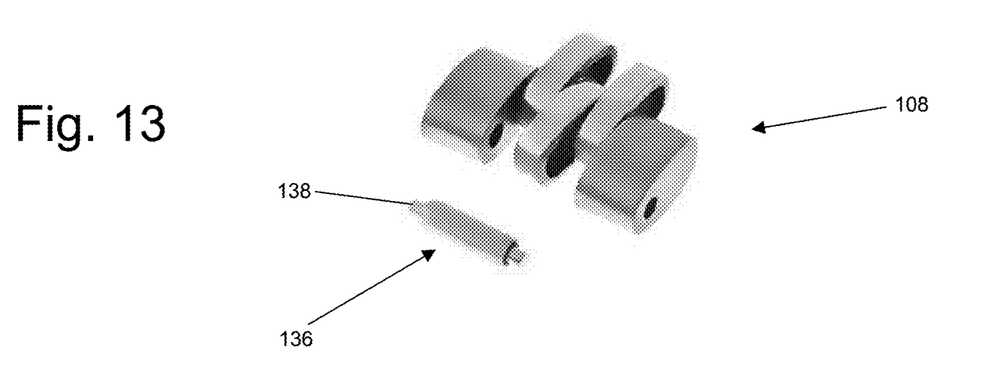
FIG. 13 is an enlarged perspective view of a link for another alternative embodiment of a mechanical watch having an integrated tracking module in accordance with principles of the invention.

FIGS. 12 and 13 show another alternative embodiment of a mechanical watch having an integrated tracking module with an anti-theft tracking module, in accordance with the principles of the invention. In this embodiment, the tracking module is integrated into the components of a watch band 130. A GPS module 132, and a battery 104 are integrated into the clasp 134. The transmitter 136 is incorporated into the lug pin 138 used to connect the links 140 of the watchband 130. The tracking module is only detectable by disassembling the watchband 130. As a result, this tracking module is difficult for a thief to detect and remove. In general a waistband of a watch is relatively easy to remove and replace compared to the internal components of a watch. Watchband 130 is therefore suitable for use in retrofitting an existing mechanical watch to include an integrated tracking module.

Whereas, the present invention has been described in relation to the drawings attached hereto, other and further modifications, apart from those shown or suggested herein, may be made within the spirit and scope of this invention. Those skilled in the art will appreciate that the conception, upon which this disclosure is based, may readily be utilized as a basis for the designing of other structures, methods and systems for carrying out the several purposes of the present invention. Descriptions of the embodiments shown in the drawings should not be construed as limiting or defining the ordinary and plain meanings of the terms of the claims unless such is explicitly indicated. The claims should be regarded as including such equivalent constructions insofar as they do not depart from the spirit and scope of the present invention.

The invention claimed is:

1. A mechanical watch with an integrated tracking module comprising:
   a mechanical watch having a dial, external mechanical components including an hour hand, a minute hand, and a gear train formed by a plurality of gears; and,
   an integrated tracking module embedded within one of the mechanical internal static components of the watch, and the tracking module includes a wireless transmitter and a microprocessor;
   wherein the wireless transmitter is only activated to detect an alert signal received through a wireless network during a predetermined receiving windows of time at predetermined receiving intervals;
   wherein the tracking module transmits intermittent location signals through the wireless network only after it receives the alert signal; and,
   wherein intermittent location signals are only emitted during predetermined emitting windows of time at predetermined emitting intervals.

2. The mechanical watch having an integrated tracking module of claim 1 further comprising a trigger located on one of the hour hand and the minute hand, and a trigger actuator on the dial which actuates the trigger to send a triggering signal to the tracking module when the trigger passes over the trigger actuator;

wherein the receiving windows of time and the emitting windows of time are initiated by the tracking module receiving the triggering signal.

3. The mechanical watch having an integrated tracking module of claim 2, further comprising a battery dedicated to the tracking module.

4. The mechanical watch having an integrated tracking module of claim 3 wherein the tracking module further comprises a global positioning module, and the intermittent location signals include location data from the global positioning module.

\* \* \* \* \*